United States Patent [19]
Nakanishi et al.

[11] Patent Number: 5,177,426
[45] Date of Patent: Jan. 5, 1993

[54] OVER-DISCHARGE PROTECTION CIRCUITRY

[75] Inventors: Akio Nakanishi, Sagamihara; Ken-ichi Ikegaya, Yokohama; Takao Naito, Anjo; Yukio Sejima; Koji Matsushima, both of Kawasaki, all of Japan

[73] Assignee: Fujitsu Limited, Kawasaki, Japan

[21] Appl. No.: 279,108

[22] Filed: Dec. 2, 1988

[30] Foreign Application Priority Data

Dec. 3, 1987 [JP]  Japan ................ 62-304419

[51] Int. Cl.⁵ .............. H02J 7/00; H01M 10/46; H04Q 7/04
[52] U.S. Cl. ........................ 320/13; 379/61; 455/89; 320/2
[58] Field of Search ............ 320/2, 13; 455/89; 379/61

[56]  References Cited
U.S. PATENT DOCUMENTS

| 3,967,180 | 6/1976 | Weber et al. | 320/13 |
| 4,237,385 | 12/1980 | Jurgens et al. | 320/13 X |
| 4,536,695 | 8/1985 | Lin | 320/2 |
| 4,726,052 | 2/1988 | Kato et al. | 320/13 X |

Primary Examiner—R. J. Hickey
Attorney, Agent, or Firm—Staas & Halsey

[57]  ABSTRACT

An over-discharge protection circuit included in a charge circuit in a portable apparatus having a portable portion and a body, the portable portion and body being interconnected by two charging terminals of the body and two terminals of the portable portion when the portable portion is placed on the body, the over-discharge protection circuit comprising: a first resistor connected across a battery charger for detecting a discharge current when a power source of the battery charger is accidentally turned OFF during a charge of the battery; a switching circuit connected between a load and a battery for disconnecting the load and battery when the power source of the battery charger is accidentally turned OFF during a charge of the battery; a switch control circuit connected to the switching circuit through a third resistor for turning the switching circuit ON/OFF; a second resistor connected between the switching circuit and the switch control circuit for controlling a flow of a charge current to the switch control circuit; and a diode connected between the switch control circuit and the first resistor for allowing a flow of the discharge current to the first resistor when the power source of the battery charger is accidentally turned OFF during a charge of the battery.

6 Claims, 4 Drawing Sheets

OVER-DISCHARGE PROTECTION CIRCUITRY

BACKGROUND OF THE INVENTION

1. Field of the Invention

The present invention relates to over-discharge protection circuit by, and more particularly, to over-discharge protection circuitry for the battery charging circuit in a portable apparatus, for example, a portable cordless (wireless) telephone.

2. Description of the Related Art

Portable cordless telephones, for example, usually comprise a portable portion (handset) and a body portion. The handset is provided with a dial or push buttons, a transmitter-receiver and a chargeable battery, and the body is provided with a transmitter-receiver and a battery charger and is connected to a telephone cable. The charge circuit is made up of a chargeable battery in the handset and a battery charger in the body. The battery charger is connected to the chargeable battery through two contact points and the chargeable battery is charged while the telephone is not in use, so as to recover the power discharged by the chargeable battery during use of the telephone.

A problem arises, however, while the chargeable battery is being charged by the battery charger. Namely, when the power source for the battery charger is turned OFF during the charging of the battery, the battery discharges power through a load (dial portion, transmitter-receiver, etc.), and if this discharging state is not interrupted, an over-discharge of the battery will occur. This problem is explained in detail hereinafter.

SUMMARY OF THE INVENTION

The object of the present invention is to provide over-discharge protection circuitry for the battery charging circuit in a portable apparatus to prevent an over-discharge of the battery when the power source to the battery charger is accidentally turned OFF during charging of the battery.

In accordance with the present invention, over-discharge protection circuitry is provided for the battery charge circuitry of a portable apparatus having a portable portion and a body. The portable portion and body are interconnected by two charging terminals of the body and two terminals of the portable portion when the portable portion is placed on the body, the over-discharge protection circuitry comprises: a first resistor connected across the battery charger for conducting a discharge current when the power source to the battery charger is accidentally turned OFF during charging of the battery. The over-discharge circuitry also includes switching circuit connected between a load and a battery for the purpose of disconnecting the load from the battery when the power source for the battery charger is accidentally turned OFF during charging of the battery; a switch control circuit connected to the switching circuit through a third resistor for controlling the turning ON/OFF of the switching circuit; a second resistor connected between the switching circuit and the switch control circuit for controlling the flow of charge current to the switch control circuit; and a diode connected between the switch control circuit; and the first resistor to permit the discharge current to flow to the first resistor when the power source to the battery charger is accidentally turned OFF during charging of the battery.

DESCRIPTION OF THE PREFERRED EMBODIMENTS

Before describing the preferred embodiments, an explanation will be given of a conventional charge circuit.

Figure 1:
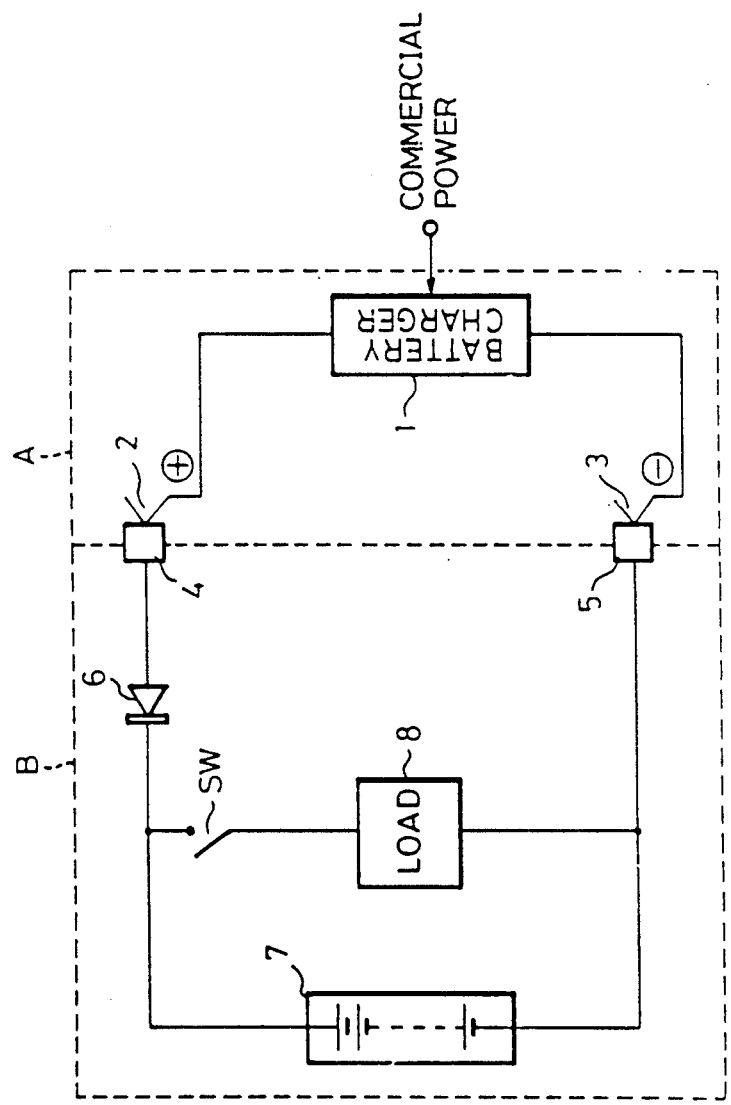
FIG. 1 is a schematic diagram illustrating the charge circuit of a conventional portable apparatus.

FIG. 1 shows the battery charging circuitry of a conventional portable apparatus. In FIG. 1, A represents a body (base board) and B represents a handset. The portable apparatus, for example, a portable cordless telephone, is constituted made up of the body and the handset B. Reference numeral 1 represents a battery charger connected to a commercial power, and source, and the reference numerals 2 and 3 identify the charging terminals provided in body A. Reference numerals 4 and 5 represent the terminals that are connected to or disconnected from the charging terminals 2 and 3, the reference numeral 6 refers to a diode, the numeral 7 refers to a battery, and the numeral 8 refers to a load (a dial portion, transmitter-receiver, etc.), all of which are provided in the handset B. Some handsets are provided with an external switch SW mounted on an external surface of the handset.

When handset B is placed on body A the terminals 4 and 5 are respectively interconnected with the corresponding charging terminals 2 and 3. The charge current flows to battery 7 through diode 6, thus preventing a reverse current. In this case, load B is able to operate while the battery is being charged. When battery 7 is fully charged by battery charger 1, after charging for a predetermined time, the flow the charge current is stopped and power to load 8 is then provided by cut and sent to the battery 7.

During the charging of the battery 7, however, sometimes the commercial power source is accidentally turned OFF, particularly during the night and in such case, battery 7 will discharge through to the load 8 and the voltage of battery 7 will gradually be lowered, and accordingly, the voltage of battery 7 may be depleted to a level at which the telephone cannot be used.

As a countermeasure to such discharge, an external switch SW is provided for some handsets. Switch SW may be turned OFF while the battery is being charged and turned ON when the telephone is used. But, unfortunately, the user frequently forgets to operate switch SW, and thus it is desirable to automatically cut the current flow the load 8 whenever when the commercial power is accidentally turned OFF while the battery is being charged.

Figure 2:
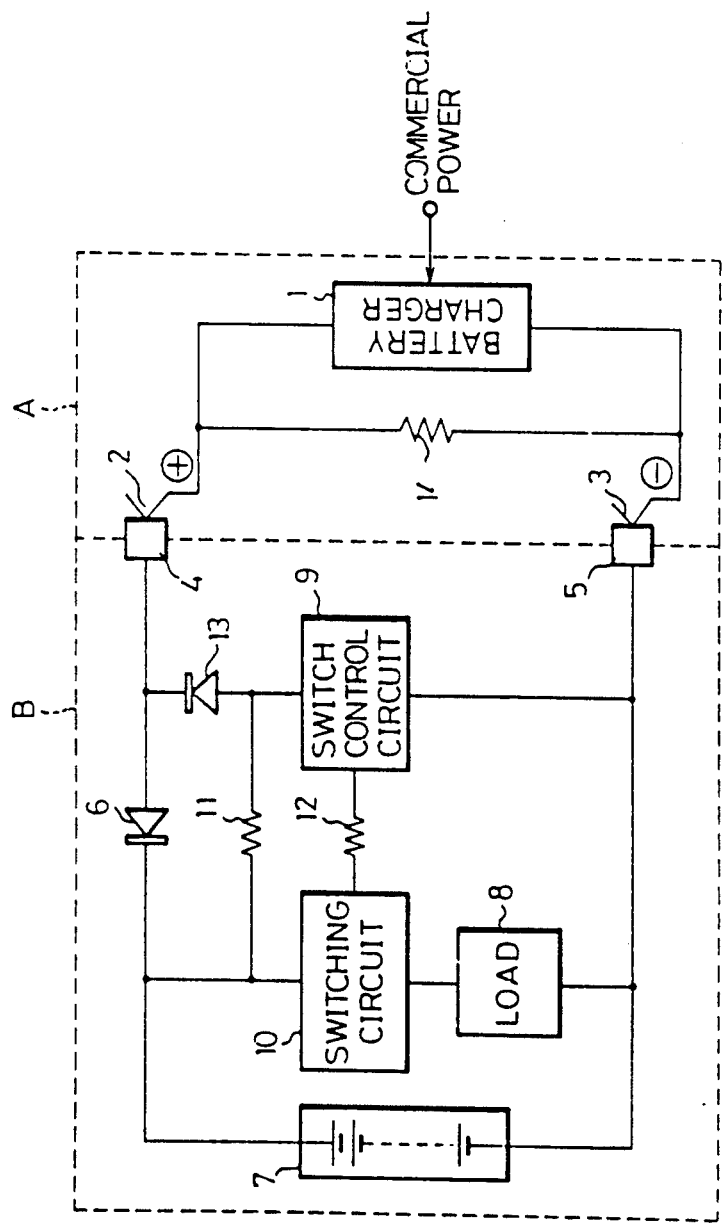
FIG. 2 is a schematic diagram illustrating a charge circuit including over-discharge protection circuitry according to the present invention.

FIG. 2 illustrates a battery charging circuit that includes over-discharge protection circuitry according to the present invention. In FIG. 2, Reference numerals 1 to 8 are used to identify the same elements as in FIG. 1, and reference numerals 9 to 14 are employed to represent new elements according to the present invention. Reference numeral 9 represents a switch control circuit, numeral 10 a switching circuit, numeral 11 a second resistor, numeral 12 a third resistor, numeral 13 a diode, and numeral 14 a first resistor. First resistor 14 is connected across battery charger 1 in body A, and switching circuit 10 is connected between load 8 and battery 7. Switch control circuit 9 is connected to switching circuit 10 through third resistor 12 and second resistor 11. Diode 13 is connected to switch control circuit 9 and first resistor 14.

The over-discharge protection circuitry according to the present invention is made up of switch control circuit 9, switching circuit 10, first resistor 14, second resistor 11, third resistor 12, and diode 13.

In this structure, battery 7 is charged by battery charger 1 through charging terminals 2 and 3, terminals 4 and 5, and diode 6 when handset B is on body A. In this case, the activation of the switch control circuit 9 is based on current flow through diode 6 and second resistor 11, and accordingly, switching circuit 10 can be turned ON/OFF by switch control circuit 9. Switching circuit 10 is turned ON when the battery is being charged.

If commercial power to battery charger 1 is accidentally turned OFF while battery 7 is being charged, switching circuit 10 is automatically turned OFF by switch control circuit 9, as briefly explained below. When the voltage across charging terminals 2 and 3 (i.e. terminals 4 and 5) becomes zero, switch control circuit 9 is inactivated and discharge current from battery 7 flows through second resistor 11, diode 13, terminal 4, charging terminal 2, and first resistor 14. In this case, the discharge current is very small because the resistance value of resistor 11 is very large. Accordingly, when switching circuit 10 is automatically turned OFF it is not possible for a discharge current to flow through load 8.

Conventionally, battery 7 will continue to discharge to load 8 and the voltage of battery 7 will gradually be lowered, and thus the voltage of battery may become depleted to a level at which the telephone cannot be used, but in the present invention, since the current flow from the battery 7 to the load 8 is cut when the commercial power is accidentally turned OFF, such an over-discharge of battery 7, is prevented.

Figure 3:
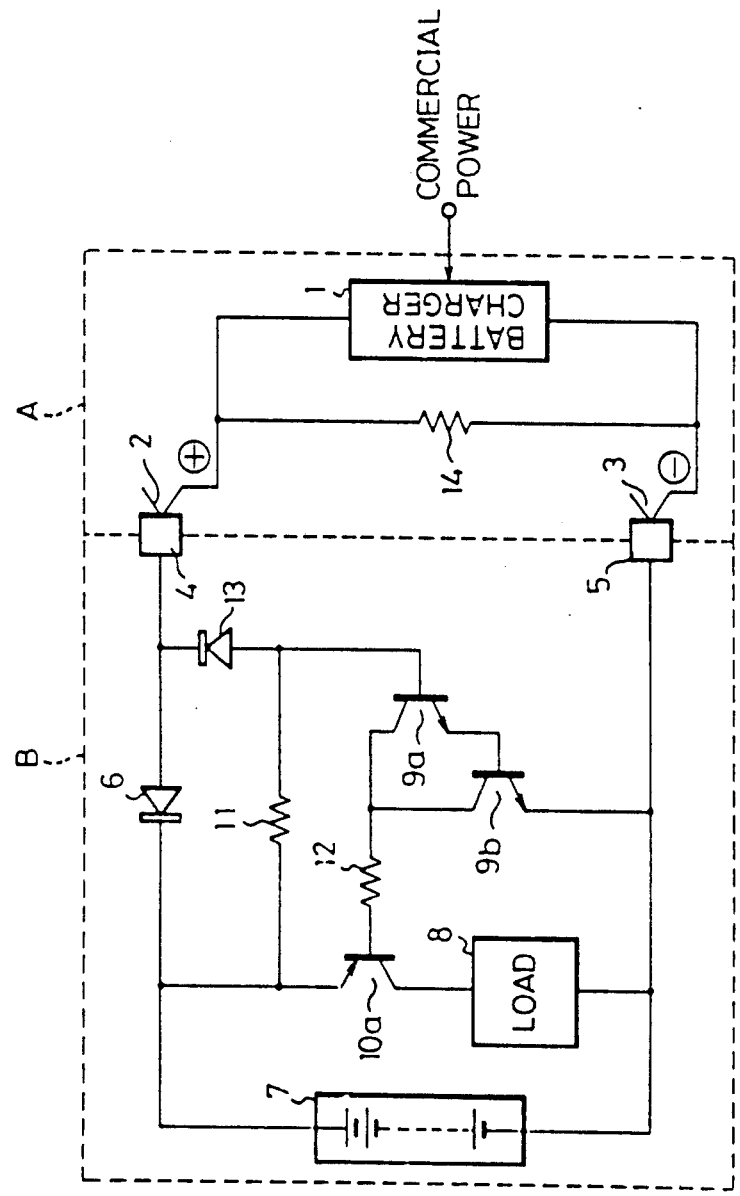
FIG. 3 is a schematic diagram illustrating an over-discharge protection circuit according to one embodiment of the present invention.

FIG. 3 is an over-discharge protection circuit according to an embodiment of the present invention. In FIG. 3, the switch control circuit 9 is constituted by two transistors 9a and 9b forming a Darlington connection. The Darlington connection is advantageous for obtaining a large current (the current amplification factor is doubled), and accordingly, the current flowing through resistor 11 can be set to a very small value; i.e., the resistance value of the resistor 11 can be set to a very large value.

As shown in FIG. 3, a collector of transistor 9a is connected to a collector of transistor 9b, and an emitter of transistor 9a is connected to a base of transistor 9b. The base of transistor 9a is connected to an emitter of transistor 10a through second resistor 11. In one embodiment of the present invention, switching circuit 10 is constituted by a PNP type transistor 10a. The emitter of transistor 10a is connected to a common contact point between battery 7, second resistor 11, and diode 6, the collector of transistor 10a is connected to load 8, and the base of transistor 10a is connected to the collectors of transistors 9a and 9b through third resistor 12.

Diode 13 is turned ON when the voltage at its anode is higher than the voltage at its cathode, and therefore, diode 13 is turned ON when the power source is accidentally turned OFF. First resistor 14 receives current flowing from battery 7 to first resistor 14 through second resistor 11, diode 13, terminal 4, and charging terminal 2 when the power source is turned OFF. A resistor such as the resistor 14 must generally be provided for a half-wave rectifier circuit (not shown) of the battery charger, because the output impedance of half-wave rectifier circuits is very large. Conversely, for a full-wave rectifier circuit (not shown, no resistor is required because the output impedance is smaller. In this latter case, the resistor 14 must still be used for over-charge protection.

During charging of battery 7, the charging current flows to battery 7 through charging terminal 2, terminal 4, and diode 6. The charging current also flows to the base of transistor 9a, and thus transistor 9a is turned ON. In this case, the current does not flow to diode 13 because the voltage of the cathode is equal to that of the anode. When transistor 9a is turned ON, transistor 9b is also turned ON and a large current flows to the base of transistor 10a through third resistor 12, and accordingly, transistor 10a is turned ON. Therefore, the charging current also flows to load 8 during charging of battery 7. The charging the battery 7 is continued until the voltage of battery is equal to that of battery 7 charger 1.

When handset B is removed from body A to use telephone, the current flows from battery 7 to transistor 9a through second resistor 11 and transistor 10a is turned ON, as explained above, and thus the current flows to load 8.

When the power source is accidentally turned OFF while battery 7 is being charged, diode 13 is turned ON because the voltage of battery charger 1 is reduced to zero. Accordingly, the current from battery 7 flows to first resistor 14 through second resistor 11 and diode 13. In this case, the resistance value of resistor 11 is larger than that of resistor 14; i.e., the relationship between these resistors is expressed as $R_{14} << R_{11}$. For example, the resistance value of resistor 11 is 470 K$\Omega$ and the resistance value of resistor 14 is 2.2 K$\Omega$ as the best mode. Accordingly, the current flowing through resistor 11 is very small (approximately, 10 $\mu$A) and the base current is also very small (approximately, 5 $\mu$A), and thus transistor 9a can not be turned ON. As a result, transistor 10a is turned OFF and load 8 is automatically disconnected from battery 7 when the power source is accidentally turned OFF while battery 7 is being charged, and thus an over-discharge of battery 7 is prevented.

In this case, although a very small current flows to resistor 14, this discharge current is negligible because it is very small in comparison with the discharge current that would nominally flow to load 8

Figure 4:
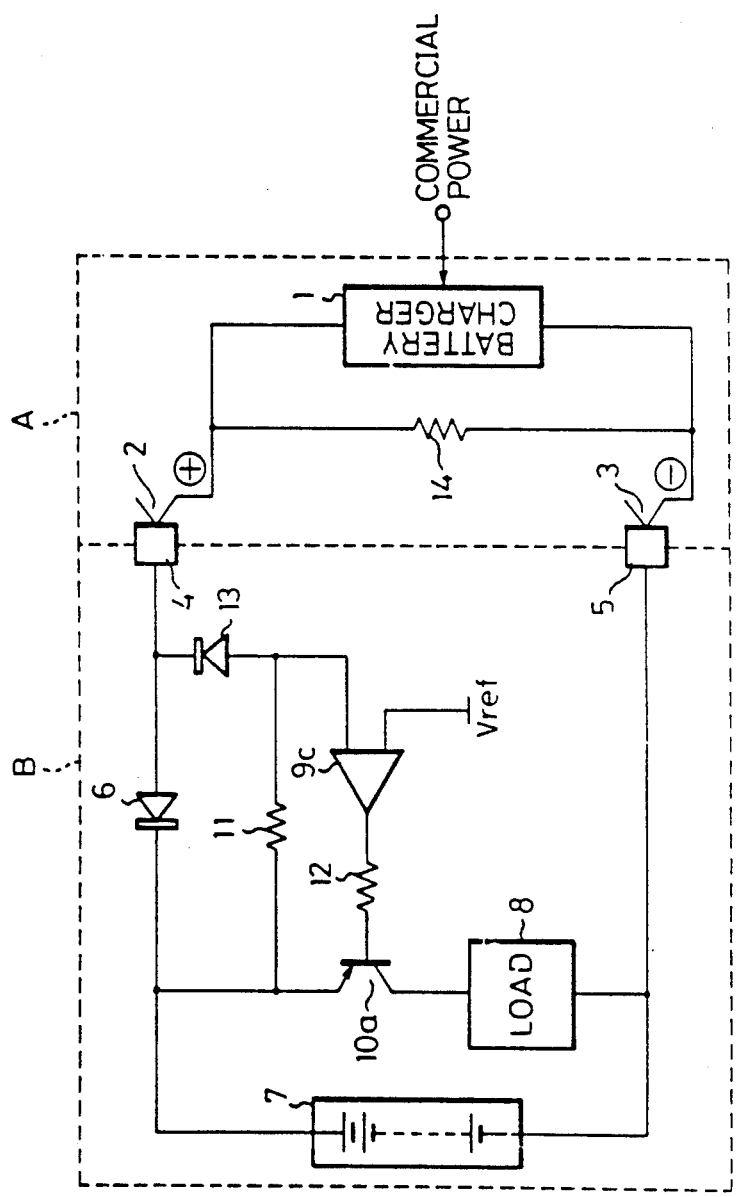
FIG. 4 is a schematic diagram illustrating an over-discharge protection circuit according to another embodiment of the present invention.

FIG. 4 illustrates an over-discharge protection circuit according to another embodiment of the present invention. In FIG. 4, reference numeral 9c represents a comparator circuit, and the symbol $V_{ref}$ represents a reference voltage. Reference voltage $V_{ref}$ is set to a value lower than the voltage of battery 7, and accordingly, comparator 9c is turned ON while battery 7 is being charged, and thus transistor 10a is also turned ON. If the power source is accidentally turned OFF, comparator 9c will be turned OFF, since the input voltage of comparator 9c becomes lower than reference voltage $V_{ref}$, and accordingly, transistor 10a is turned OFF because no current is supplied thereto from comparator 9c. The other operations are the same as those of the circuit shown in FIG. 3, and thus further explanation thereof is not needed.

Although the above explanation has been given with regard to a portable cordless telephone as one embodiment, it is possible to apply the over-discharge protection circuitry of the present invention to other portable apparatuses having a secondary battery charged by a battery charger.

We claim:

1. A portable apparatus having a portable portion and a body portion, said portable portion including a battery, a load an two charging terminals connected to the battery and said body portion including a battery charger adapted to be connected to a power source and two charging terminals connected to the battery chargers, the terminals of the body portion being connected with the terminals of the portable portion to present a charging circuit when the portable portion is placed on the body portion, said apparatus further including an over-discharge protection circuit for this charging circuit comprising:
   a first resistor circuit connected electrically across the battery charger for conducting a discharge current when a power source connected to the battery charger is accidentally turned off while the battery is being charged;
   switch means electrically connected between the load and the battery for selectively connecting or disconnecting the load from the battery;
   switch control means electrically connected across the battery and operably connected to the switch means for normally operating the latter to electrically connect the load and the battery;
   a second resistor connected between the battery and the switch control means for controlling the flow of current to the latter; and
   a diode connected between the switch control means and the first resistor for diverting the flow of current from the switch control means to the first resistor when the power source of the battery charger is accidentally turned off.

2. Apparatus as set forth in claim 1, wherein said switch means comprises a PNP type resistor.

3. Apparatus as set forth in claim 1, wherein said switch control means comprises two transistors forming a Darlington connection.

4. Apparatus as set forth in claim 1, wherein said switch control means comprises a comparator.

5. A portable apparatus having a portable portion and a body portion, said portable portion including a battery, a load and two charging terminals connected to the battery and said body portion including a battery charger adapted to be connected to a power source and two charging terminals connected to the battery charger, the terminals of the body portion being connected with the terminals of the portable portion to present a charging circuit when the portable portion is place don the body portion, said apparatus further including over-discharge protection means for this charging circuit comprising:
   an ON-OFF switch connected between the battery and the load;
   control means operably connected to the switch for normally keeping the switch turned ON; and
   means for turning the switch OFF whenever the portable portion is in place on the body portion and the voltage across the charging terminals is less than the voltage of the battery.

6. Apparatus as set forth in claim 5, wherein said control means is normally electrically powered to keep the switch ON and said means for turning the switch OFF comprising a diode for diverting the electrical power from the control means.

* * * * *

UNITED STATES PATENT AND TRADEMARK OFFICE
CERTIFICATE OF CORRECTION

PATENT NO. : 5,177,426

DATED : January 5, 1993          Page 1 of 2

INVENTOR(S) : AKIO NAKANISHI, KEN-ICHI IKEGAYA, TAKAO NAITO, YUKIO SEJIMA and KOJI MATSUSHIMA It is certified that error appears in the above-identified patent and that said Letters Patent is hereby corrected as shown below:

```
Column 1, line 7, "circuit by" should be --circuitry--;
          line 16, after "body" insert --portion--;
          line 21, after "points" insert a comma --,--;
          line 48, "body, the" should be --body.  The--;
          line 64, after "circuit" delete the semicolon --;--.

Column 2, line 25, delete "constituted";
          line 27, after "power" delete ", and";
          line 42, "B" should be --8--;
          line 45, the second occurrence of "the" should be
              --of--;
          line 46, after the first occurrence of "and" insert
              --the--;
          lines 46 and 47, delete "cut and sent to the";
          line 51, delete "to the";
          line 61, the first occurrence of "the" should be
              --to--, delete "when".

Column 3, line 18, after "is" insert --in place--;
          line 41, after "battery" insert --7--;
          line 43, ", but" should be --.  But--, after "in"
              insert --accordance with--;
          line 44, delete the second occurrence of "the",
              "when" should be --off whenever--;
          line 45, after "power" insert --source--, delete
              "an";
          line 48, "an" should be --one--;
          line 49, delete "the", "is constituted by" should be
              --consists of--;
          line 55, delete "the".
```

UNITED STATES PATENT AND TRADEMARK OFFICE
CERTIFICATE OF CORRECTION

PATENT NO. : 5,177,426

DATED : January 5, 1993

INVENTOR(S) : AKIO NAKANISHI, KEN-ICHI IKEGAYA, TAKAO NAITO, YUKIO SEJIMA and KOJI MATSUSHIMA It is certified that error appears in the above-identified patent and that said Letters Patent is hereby corrected as shown below:

Column 4, line 28, after the first occurrence of "battery" insert --700, after the second occurrence of "battery" delete "7";
        line 31, before "telephone" insert --the--, after "transistor" insert --the--.

Column 5, line 21, "chargers" should be --charger--.

Column 6, line 24, "place don" should be --placed on--.

Signed and Sealed this

Fourth Day of October, 1994

Attest:

BRUCE LEHMAN

Attesting Officer

Commissioner of Patents and Trademarks